US006867850B2

(12) United States Patent
McClurg et al.

(10) Patent No.: US 6,867,850 B2
(45) Date of Patent: Mar. 15, 2005

(54) LIGHT WEDGE FOR ILLUMINATING A PLATEN IN A PRINT SCANNER

(75) Inventors: George W. McClurg, Jensen Beach, FL (US); Dean J. Fedele, Jupiter, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 0 days.

(21) Appl. No.: 10/409,156

(22) Filed: Apr. 9, 2003

(65) Prior Publication Data

US 2003/0206287 A1 Nov. 6, 2003

Related U.S. Application Data

(63) Continuation-in-part of application No. 10/050,046, filed on Jan. 17, 2002.

(51) Int. Cl.[7] .................................................. G06K 9/74
(52) U.S. Cl. ........................... 356/71; 382/124; 382/127
(58) Field of Search ........................... 356/71; 359/15, 359/566; 382/124; 362/31, 552, 555, 558

(56) References Cited

U.S. PATENT DOCUMENTS

| 2,500,017 A | 3/1950 | Altman |
| 3,200,701 A | 8/1965 | White |
| 3,475,588 A | 10/1969 | McMaster |
| 3,482,498 A | 12/1969 | Becker |
| 3,495,259 A | 2/1970 | Rocholl et al. |
| 3,527,535 A | 9/1970 | Monroe |
| 3,540,025 A | 11/1970 | Levin et al. |
| 3,617,120 A | 11/1971 | Roka |
| 3,699,519 A | 10/1972 | Campbell |
| 3,743,421 A | 7/1973 | Maloney |
| 3,906,520 A | 9/1975 | Phillips |
| 3,944,978 A | 3/1976 | Jensen et al. |
| 3,947,128 A | 3/1976 | Weinberger et al. |

(List continued on next page.)

FOREIGN PATENT DOCUMENTS

| EP | 0 101 772 A1 | 3/1984 |
| EP | 0 308 162 A3 | 3/1989 |
| EP | 0 308 162 A2 | 3/1989 |
| EP | 0 379 333 A1 | 7/1990 |
| EP | 0 623 890 A3 | 11/1994 |

(List continued on next page.)

OTHER PUBLICATIONS

International Search Report from PCT Appl. No. PCT/US03/01167, 4 pages, mailed Apr. 10, 2003.
Btt (Biometric Technology Today), Finger technologies contacts, 2 pages.

(List continued on next page.)

Primary Examiner—Michael P. Stafira
Assistant Examiner—Juan D. Valentin, II
(74) Attorney, Agent, or Firm—Sterne, Kessler, Goldstein & Fox P.L.L.C.

(57) ABSTRACT

Light wedges that reflect light internally and produce diffuse light for uniformly illuminating a platen in a print scanner are presented. In one example, a light wedge has a first surface that receives light emitted from an illumination source and a second surface that limits specular reflections. The light wedge transmits light from the illumination source toward the platen, whereby uniform illumination is provided to the platen. In another example, a light wedge has an illumination surface that receives light emitted from the illumination source, a first surface that limits specular reflections, and a second surface that acts as a diffuser. The second surface reflects light out of the light wedge toward the platen, whereby uniform illumination is provided to the platen.

17 Claims, 8 Drawing Sheets

U.S. PATENT DOCUMENTS

| | | |
|---|---|---|
| 3,968,476 A | 7/1976 | McMahon |
| 3,975,711 A | 8/1976 | McMahon |
| 4,032,975 A | 6/1977 | Malueg et al. |
| 4,063,226 A | 12/1977 | Kozma et al. |
| 4,120,585 A | 10/1978 | DePalma et al. |
| 4,152,056 A | 5/1979 | Fowler |
| 4,209,481 A | 6/1980 | Kashiro et al. |
| 4,210,899 A | 7/1980 | Swonger et al. |
| 4,253,086 A | 2/1981 | Szwarcbier |
| 4,322,163 A | 3/1982 | Schiller |
| 4,414,684 A | 11/1983 | Blonder |
| 4,537,484 A | 8/1985 | Fowler et al. |
| 4,544,267 A | 10/1985 | Schiller |
| 4,553,837 A | 11/1985 | Marcus |
| 4,601,195 A | 7/1986 | Garritano |
| 4,669,487 A | 6/1987 | Frieling |
| 4,681,435 A | 7/1987 | Kubota et al. |
| 4,684,802 A | 8/1987 | Hakenewerth et al. |
| 4,701,772 A | 10/1987 | Anderson et al. |
| 4,783,823 A | 11/1988 | Tasaki et al. |
| 4,784,484 A | 11/1988 | Jensen |
| 4,792,226 A | 12/1988 | Fishbine et al. |
| 4,811,414 A | 3/1989 | Fishbine et al. |
| 4,876,726 A | 10/1989 | Capello et al. |
| 4,905,293 A | 2/1990 | Asai et al. |
| 4,924,085 A | 5/1990 | Kato et al. |
| 4,933,976 A | 6/1990 | Fishbine et al. |
| 4,942,482 A | 7/1990 | Kakinuma et al. |
| 4,946,276 A | 8/1990 | Chilcott |
| 4,995,086 A | 2/1991 | Lilley et al. |
| 5,054,090 A | 10/1991 | Knight et al. |
| 5,067,162 A | 11/1991 | Driscoll, Jr. et al. |
| 5,067,749 A | 11/1991 | Land |
| 5,131,038 A | 7/1992 | Puhl et al. |
| 5,146,102 A | 9/1992 | Higuchi et al. |
| 5,157,497 A | 10/1992 | Topper et al. |
| 5,177,353 A | 1/1993 | Schiller |
| 5,185,673 A | 2/1993 | Sobol |
| 5,187,747 A | 2/1993 | Capello et al. |
| 5,210,588 A | 5/1993 | Lee |
| 5,222,152 A | 6/1993 | Fishbine et al. |
| 5,222,153 A | 6/1993 | Beiswenger |
| 5,230,025 A | 7/1993 | Fishbine et al. |
| 5,233,404 A | 8/1993 | Lougheed et al. |
| 5,249,370 A | 10/1993 | Stanger et al. |
| 5,253,085 A | 10/1993 | Maruo et al. |
| 5,261,266 A | 11/1993 | Lorenz et al. |
| 5,285,293 A | 2/1994 | Webb et al. |
| 5,291,318 A | 3/1994 | Genovese |
| D348,445 S | 7/1994 | Fishbine et al. |
| 5,351,127 A | 9/1994 | King et al. |
| D351,144 S | 10/1994 | Fishbine et al. |
| 5,363,318 A | 11/1994 | McCauley |
| 5,384,621 A | 1/1995 | Hatch et al. |
| 5,412,463 A | 5/1995 | Sibbald et al. |
| 5,416,573 A | 5/1995 | Sartor, Jr. |
| 5,448,649 A | 9/1995 | Chen et al. |
| 5,467,403 A | 11/1995 | Fishbine et al. |
| 5,469,506 A | 11/1995 | Berson et al. |
| 5,471,240 A | 11/1995 | Prager et al. |
| 5,473,144 A | 12/1995 | Mathurin, Jr. |
| 5,483,601 A | 1/1996 | Faulkner |
| 5,509,083 A | 4/1996 | Abtahi et al. |
| 5,517,528 A | 5/1996 | Johnson |
| 5,528,355 A | 6/1996 | Maase et al. |
| 5,548,394 A | 8/1996 | Giles et al. |
| 5,591,949 A | 1/1997 | Bernstein |
| 5,596,454 A | 1/1997 | Hebert |
| 5,598,474 A | 1/1997 | Johnson |
| 5,613,014 A | 3/1997 | Eshera et al. |
| 5,615,277 A | 3/1997 | Hoffman |
| 5,625,448 A * | 4/1997 | Ranalli et al. ................. 356/71 |
| 5,640,422 A | 6/1997 | Johnson |
| 5,649,128 A | 7/1997 | Hartley |
| 5,650,842 A | 7/1997 | Maase et al. |
| 5,661,451 A | 8/1997 | Pollag |
| 5,680,205 A | 10/1997 | Borza |
| 5,689,529 A | 11/1997 | Johnson |
| 5,717,777 A | 2/1998 | Wong et al. |
| 5,726,443 A | 3/1998 | Immega et al. |
| 5,729,334 A | 3/1998 | Van Ruyven |
| 5,736,734 A | 4/1998 | Marcus et al. |
| 5,745,684 A | 4/1998 | Oskouy et al. |
| 5,748,766 A | 5/1998 | Maase et al. |
| 5,748,768 A | 5/1998 | Sivers et al. |
| 5,755,748 A | 5/1998 | Borza |
| 5,757,278 A | 5/1998 | Itsumi |
| 5,767,989 A | 6/1998 | Sakaguchi |
| 5,778,089 A | 7/1998 | Borza |
| 5,781,647 A | 7/1998 | Fishbine et al. |
| 5,793,218 A | 8/1998 | Oster et al. |
| 5,801,681 A | 9/1998 | Sayag |
| 5,805,777 A | 9/1998 | Kuchta |
| 5,809,172 A | 9/1998 | Melen |
| 5,812,067 A | 9/1998 | Bergholz et al. |
| 5,815,252 A | 9/1998 | Price-Francis |
| 5,818,956 A | 10/1998 | Tuli |
| 5,822,445 A | 10/1998 | Wong |
| 5,825,005 A | 10/1998 | Behnke |
| 5,825,474 A | 10/1998 | Maase |
| 5,828,773 A | 10/1998 | Setlak et al. |
| 5,832,244 A | 11/1998 | Jolley et al. |
| 5,848,231 A | 12/1998 | Teitelbaum et al. |
| 5,855,433 A | 1/1999 | Velho et al. |
| 5,859,420 A | 1/1999 | Borza |
| 5,859,710 A | 1/1999 | Hannah |
| 5,862,247 A | 1/1999 | Fisun et al. |
| 5,867,802 A | 2/1999 | Borza |
| 5,869,822 A | 2/1999 | Meadows, II et al. |
| 5,872,834 A | 2/1999 | Teitelbaum |
| 5,892,599 A | 4/1999 | Bahuguna |
| 5,900,993 A | 5/1999 | Betensky |
| 5,907,627 A | 5/1999 | Borza |
| 5,920,384 A | 7/1999 | Borza |
| 5,920,640 A | 7/1999 | Salatino et al. |
| 5,928,347 A | 7/1999 | Jones |
| 5,942,761 A | 8/1999 | Tuli |
| 5,946,135 A | 8/1999 | Auerswald et al. |
| 5,960,100 A | 9/1999 | Hargrove |
| 5,973,731 A | 10/1999 | Schwab |
| 5,974,162 A | 10/1999 | Metz et al. |
| 5,987,155 A | 11/1999 | Dunn et al. |
| 5,991,467 A | 11/1999 | Kamiko |
| 5,995,014 A | 11/1999 | DiMaria |
| 5,999,307 A | 12/1999 | Whitehead et al. |
| 6,018,739 A | 1/2000 | McCoy et al. |
| 6,023,522 A | 2/2000 | Draganoff et al. |
| 6,038,332 A | 3/2000 | Fishbine et al. |
| 6,041,372 A | 3/2000 | Hart et al. |
| 6,055,071 A | 4/2000 | Kuwata et al. |
| 6,064,398 A | 5/2000 | Ellenby et al. |
| 6,064,753 A | 5/2000 | Bolle et al. |
| 6,064,779 A | 5/2000 | Neukermans et al. |
| 6,072,891 A | 6/2000 | Hamid et al. |
| 6,075,876 A | 6/2000 | Draganoff |
| 6,078,265 A | 6/2000 | Bonder et al. |
| 6,088,585 A | 7/2000 | Schmitt et al. |
| 6,097,873 A | 8/2000 | Filas et al. |
| 6,104,809 A | 8/2000 | Berson et al. |
| 6,115,484 A | 9/2000 | Bowker et al. |
| 6,122,394 A | 9/2000 | Neukermans et al. |

| | | | |
|---|---|---|---|
| 6,144,408 A | | 11/2000 | MacLean |
| 6,150,665 A | | 11/2000 | Suga |
| 6,154,285 A | | 11/2000 | Teng et al. |
| 6,162,486 A | | 12/2000 | Samouilhan et al. |
| 6,166,787 A | | 12/2000 | Akins et al. |
| 6,178,255 B1 | | 1/2001 | Scott et al. |
| 6,195,447 B1 | | 2/2001 | Ross |
| 6,198,836 B1 | | 3/2001 | Hauke |
| 6,204,331 B1 | | 3/2001 | Sullivan et al. |
| 6,240,200 B1 | * | 5/2001 | Wendt et al. ............... 382/127 |
| 6,259,108 B1 | * | 7/2001 | Antonelli et al. ............ 356/71 |
| 6,272,562 B1 | | 8/2001 | Scott et al. |
| 6,281,931 B1 | | 8/2001 | Tsao et al. |
| 6,327,047 B1 | | 12/2001 | Motamed |
| 6,347,163 B2 | | 2/2002 | Roustaei |
| 6,355,937 B2 | * | 3/2002 | Antonelli et al. ............ 356/71 |
| 6,404,904 B1 | | 6/2002 | Einighammer et al. |
| 6,414,749 B1 | * | 7/2002 | Okamoto et al. ............ 356/71 |
| 6,444,969 B2 | | 9/2002 | Johnson |
| 6,485,981 B1 | * | 11/2002 | Fernandez ................... 436/71 |
| 6,643,390 B1 | * | 11/2003 | Clark et al. ................... 356/71 |
| 2002/0030668 A1 | | 3/2002 | Hoshino et al. |
| 2002/0106115 A1 | | 8/2002 | Rajbenbach et al. |
| 2003/0133103 A1 | | 7/2003 | Arnold et al. |

FOREIGN PATENT DOCUMENTS

| | | |
|---|---|---|
| EP | 0 623 890 A2 | 11/1994 |
| EP | 0 653 882 A1 | 5/1995 |
| EP | 0 379 333 B1 | 7/1995 |
| EP | 0 889 432 A3 | 1/1999 |
| EP | 0 889 432 A2 | 1/1999 |
| EP | 0 905 646 A1 | 3/1999 |
| EP | 0 785 750 B1 | 6/1999 |
| EP | 0 924 656 A2 | 6/1999 |
| EP | 0 623 890 B1 | 8/2001 |
| GB | 2 089 545 A | 6/1982 |
| GB | 2 313 441 A | 11/1997 |
| JP | 62-212892 A | 9/1987 |
| JP | 1-205392 A | 8/1989 |
| JP | 3-161884 A | 7/1991 |
| JP | 3-194674 A | 8/1991 |
| JP | 3-194675 A | 8/1991 |
| JP | 11-225272 A | 8/1999 |
| JP | 11-289421 A | 10/1999 |
| WO | WO 87/02491 A1 | 4/1987 |
| WO | WO 90/03620 A1 | 4/1990 |
| WO | WO 92/11608 A1 | 7/1992 |
| WO | WO 94/22371 A3 | 10/1994 |
| WO | WO 94/22371 A2 | 10/1994 |
| WO | WO 96/17480 A2 | 6/1996 |
| WO | WO 96/17480 A3 | 6/1996 |
| WO | WO 97/29477 A1 | 8/1997 |
| WO | WO 97/41528 A1 | 11/1997 |
| WO | WO 98/09246 A1 | 3/1998 |
| WO | WO 98/12670 A1 | 3/1998 |
| WO | WO 99/12123 A1 | 3/1999 |
| WO | WO 99/26187 A1 | 5/1999 |
| WO | WO 99/40535 A1 | 8/1999 |

OTHER PUBLICATIONS

Drake, M.D. et al., "Waveguide hologram fingerprint entry device," *Optical Engineering,* vol. 35, No. 9, Sep. 1996, pp. 2499–2505.

Roethenbaugh, G. (ed.), *Biometrics Explained,* 1998, ICSA, pp. 1–34.

*Automated identification Systems* (visited May 20, 1999) <http://www.trw.com/idsystems/bldgaccess2.html>, 1 page, Copyright 1999.

*Ultra–Scan Corporation Home Page* (visited May 20, 1999) <http://www.ultra–scan.com/index.htm>, 3 pages. (discusses technology as early as 1996).

*Profile* (last updated Aug. 16, 1998) <http://www.dermalog.de/Britain/Profile/profile.htm>, 3 pages. (discusses technology as early as 1990).

*ID–Card System Technical Specifications* (last updated Jul. 18, 1998) <http://dermalog.de/Britain/Products/ID–Card/idcard2.htm>, 2 pages.

*Fujitsu Limited Products and Services* (updated Apr. 21, 1999) <http://www.fujitsu.co.jp/hypertext/Products/index–e.html>, 3 pages, Copyright 1995–1999.

*SonyDCam* (visited May 20, 1999) <http://www.microsoft.com/DDK/ddkdocs/Win2k/sonydcam.htm>, 3 pages, Copyright 1999.

*Verid Fingerprint Verification* (visited May 17, 1999) <http://www.tssi.co.uk/products/finger.html>, 2 pages.

*Startek's Fingerprint Verification Products: Fingerguard FG–40* (visited May 18, 1999) <http://www.startek.com.tw/product/fg40/fg40.html>, 3 pages.

*SAC Technologies Showcases Stand–Alone SAC–Remote(TM)* (visited May 18, 1999) <http://www.pathfinder.com/money/latest/press/PW/1998Mar25/1026.html>, 2 pages.

"Biometrics, The Future Is Now," www.securitymagazine.com, May 1999, pp. 25–26.

*Mytec Technologies Gateway,* (visited Apr. 27, 1999) <http://www.mytec.com/Products/gateway/>, 1 page.

*Mytec Technologies Gateway: Features & Benefits,* (visited Apr. 27, 1999) <http://www.mytec.com/Products/gateway/features.htm>, 1 page.

*Mytec Technologies Touchstone Pro,* (visited Apr. 27, 1999) <http://www.mytec.com/Products/Touchstone/>, 1 page.

*Mytec Technologies Touchstone Pro: Features,* (visited Apr. 27, 1999) <http://www.mytec.com/Products/Touchstone/features.htm>, 1 page.

*Electronic Timeclock Systems and Biometric Readers* (last updated Apr. 17, 1999) <http://www.Ifs–hr–bene.com/tclocks.html>, 1 page.

*Fingerprint Time Clock* (visited May 17, 1999) <http://www.lfs–hr–bene.com/Biometrics/Fingerprintclock.html>, 6 pages.

*KC–901: The KSI fingerprint sensor* (visited May 17, 1999) <http://www.kinetic.bc.ca/kc–901.html>, 3 pages.

*Intelnet Inc.* (visited May 20, 1999) <http://www.Intelgate.com/index.html>, 1 page, Copyright 1996.

*Ver–i–Fus Fingerprint Access Control System* (visited May 20, 1999) <http://www.intelgate.com/verifus.htm>, 2 pages, (Ver–i–fus product released in 1995).

*Ver–i–Fus® Configurations* (visited May 20, 1999) <http://www.intelgate.com/verconfig.htm>, 1 page. (Ver–i–fus product released in 1995).

*Ver–i–fus® & Ver–i–Fus$^{mit®}$*(visitied May 20, 1999) <http://www.intelgate.com/vif_data.htm>, 3 pages. (Ver–i–fus product released in 1995).

*Access Control System Configurations* (visited May 20, 1999) <http://www.intelgate.com/access.htm>, 2 pages. (Ver–i–fus product released in 1995).

*Company* (visited May 17, 1999) <http://www.instainfo.com.company.htm>, 2 pages.

*TouchLock™ II Fingerprint Identity Verification Terminal* (visited May 17, 1999) <http://www.identix.com/TLock.htm>, 4 pages.

*Physical Security and Staff Tracking Solutions* (visited May 17, 1999) <http://www.identix.com/products/biosecurity.html>, 3 pages, Copyright 1996–1998.

*Veriprint2000 Fingerprint Verification Terminal For Use With Jantek Time & Attendance Software* (visited May 17, 1999) <http://www.hunterequipment.com/fingerprint.htm>, 2 pages.

*Veriprint Product Applications* (visited Apr. 27, 1999) <http://www.biometricid.com/uses.htm>, 1 page, Copyright 1999.

*BII Home Page* (visited Apr. 27, 1999) <http://www.biometricid.com/homepage.htm>, 1 page, Copyright 1999.

*Veriprint 2100 Stand–Alone Fingerprint Verification Terminal* (visited Apr. 27, 1999) <http://www.biometricid.com/veriprint2100.htm>, 3 pages.

Randall, N., "A Serial Bus on Speed," *PC Magazine,* May 25, 1999, pp. 201–203.

*The DERMALOG Check–ID* (visited Nov. 12, 1999) <http://www.dermalog.de/ganzneu/products_check.html>, 1 page.

*Check–ID Specifications and Features* (visited Nov. 12, 1999) <http://www.dermalog.de/ganzneu/spec_check.html>, 1 page, Copyright 1999.

*Startek's Fingerprint Verification Products: FingerFile 1050* (visited Oct. 8, 1999) <http://www.startek.com.tw/product/ff1050/ff1050.html>, 3 pages.

*Time is Money!* (visited Jun. 5, 1998) <http://www.laus.com/afim.htm>, 3 pages.

*LS 1 LiveScan Booking Workstation High Performance Finger & Palm Scanning System* (visited Jun. 4, 1998) <http://www.hbs–jena.com/ls1.htm>, 6 pages, Copyright 1998.

*Welcome to the Homepage of Heimann Biometric Systems GMBH* (visited Jun. 4, 1998) <http://www.hbs–jena.com/>, 1 page, Copyright 1998.

*Heimann Biometric Systems Corporate Overview* (visited Jun. 4, 1998) <http://www.hbs–jena.com/company.htm>, 4 pages, Copyright 1998.

*Remote Access Positive IDentification—raPID* (visited Jun. 3, 1998) <http://www.nec.com/cgi–bin/showproduct.exe?pro...emote+Access+Positive+IDentification+%2D+raPID>, 2 pages, Copyright 1997.

*Morpho DigiScan Cellular* (visited Jun. 3, 1998) <http://www.morpho.com/products/law_enforcement/digiscan/cellular.htm>, 2 pages, Copyright 1998.

*A.F.I.S.* (last updated Apr. 2, 1998) <http://www.dermalog.de/afis.htm>, 2 pages.

*Morpho FlexScan Workstation* (visited Jun. 3, 1998) <http://www.morpho.com/products/law_enforcement/flexscan/>, 2 pages, Copyright 1998.

True–ID® The LiveScan with special "ability" . . . , 2 pages.

*Printrak International: User List* (visited Jun. 3, 1998) <http://www.printrakinternational.com and links>, 10 pages, Copyright 1996.

*Live–Scan Products: Tenprinter® 1133S* (visited Apr. 23, 1999) <http://www.digitalbiometrics.com/Products/tenprinter.htm>, 4 pages. (Tenprinter 1133S released in 1996).

*TouchPrint™ 600 Live–Scan System* (visited Nov. 17, 1999) <http://www.identix.com/products/livescan.html>, 4 pages, Copyright 1996–1998.

Systems for Live–Scan Fingerprinting, Digital Biometrics, Inc., 8 pages, Copyright 1998.

DBI FingerPrinter CMS, Digital Biometrics, Inc., 5 pages. (CMS released in 1998).

Fingerscan V20, Identix Incorporated 1 page, Copyright 1999.

Verid Fingerprint Reader, TSSI, 4 pages.

Response to Request for Information, Cross Match Technologies, Inc., 13 pages, Apr. 14, 1999.

*Startek's Fingerprint Verification Products* (visited Nov. 17, 1999) <http://www.startek.com.tw/product/index.html>, 1 page.

*Introduction to Startek's Fingerprint Verification Products* (visited Nov. 17, 1999) <http://www.startek.com.tw/product/index2.html>, 2 pages.

*Automatic Fingerprint Identification Systems* (visited Nov. 17, 1999) <http://www.sagem.com/en/produit4–en/empreinte–dig–en.htm>, 1 page.

*Digital Biometrics Corporate Information* (visited Nov. 17, 1999) <http://www.digitalbiometrics.com/Corporate_info/Corporate_info.htm>, 2 pages. (discusses technology as early as 1985).

*DBI Live–Scan Products: Digital Biometrics TENPRINTER* (visited Nov. 17, 1999) <http://www.digitalbiometrics.com/products/tenprinter.htm>, 4 pages. (Tenprinter released in 1996).

*DBI Live–Scan Products: Networking Options* (visited Nov. 17, 1999) <http://www.digitalbiometrics.com/products/networking_optics.htm>, 3 pages.

*DBI Live–Scan Products: Digital Biometrics FingerPrinter CMS* (visited Nov. 17, 1999) <http://www.digitalbiometrics.com/products/FingerPrinterCMS.htm>, 3 pages. (CMS released in 1998).

*DBI Live–Scan Products: Image Printer Stations* (visited Nov. 17, 1999) <http://www.digitalbiometrics.com/products/imageprinter.htm>, 2 pages.

*DBI Live–Scan Products: FC–21 Fingerprint Capture Station* (visited Nov. 17, 1999) http://www.digitalbiometrics.com/products/Fingerprintercapture.htm>, 2 pages.

*Series 400 OEM Scanner* (visited Nov. 17, 1999) <http://www.ultra–scan.com/400.htm>, 3 pages. (Scanner released in 1996).

*USC Scanner Design* (visited Nov. 17, 1999) <http://www.ultra–scan.com/scanner.htm>, 4 pages. (Scanner released in 1996).

*Series 500/600 Scanners* (visited Nov. 17, 1999) <http://www.ultra–scan.com/500.htm>, 3 pages. (Scanner released in 1996).

*Series 700 ID Station* (visited Nov. 17, 1999) <http://www.ultra–scan.com/700.htm>, 3 pages. (Scanner released in 1998).

*Identix: The Corporation* (visited Nov. 17, 1999) <http://www.identix.com/corporate/home.htm>, 2 pages. Copyright 1996–1998.

*Biometric Imaging Products* (visited Nov. 17, 1999) <http://www.indentix.com/products/bioimage.htm>, 1 page, Copyright 1996–1998.

*TouchPrint™ 600 Live–Scan System* (visited Apr. 23, 1999) <http://www.identix.com/products/livescan.htm>, 4 pages, Copyright 1996–1998.

*TouchPrint™ 600 Palm Scanner* (visited Nov. 17, 1999) <http://www.identix.com/products/palmscan.htm>, 3 pages, Copyright 1996–1998.

*TouchPrint™ 600 Card Scan System* (visited Nov. 17, 1999) <http://www.indentix.com/products/cardscan.htm>, 3 pages, Copyright 1996–1998.

*Dermalog Key—The safest and easiest way of access control* (Last updated Jul. 18, 1998) <http://www.dermalog.de/Britian/Products/Key/key.htm>, 1 page.
*Dermalog Finge–ID Your small size solution for high security* (Last updated Jul. 18, 1998) <http://www.dermalog.de/Britain/Products/Finger/fingerid.htm>, 1 page.
*Mytec: Corporate* (visited Nov. 17, 1999) <http://www.mytec.com/corporate/>, 2 pages.
*Kinetic Sciences Inc. Fingerprint Biometrics Division* (visited Nov. 17, 1999) <http://www.kinetic.bc.ca/main–FPB.html>, 1 page.
*Fingerprint Biometrics: Securing The Next Generation*, May 19, 1999 (visited Nov. 17, 1999) <http://www.secugen.com/pressrel.htm>, 2 pages.
*Secugen Unveils Fully Functional Fingerprint Recognition Solutions*, May 11, 1999 (visited Nov. 1999) <http://www.secugen.com/pressrel.htm>, 3 pages.
*POLLEX Technology Ltd., The Expert in Fingerprint Identification—POLLog* (visited Nov. 17, 1999) <http://www.pollex.ch/english/products/pollog.htm>, 2 pages.
*Sony Fingerprint Identification Terminal* (visited Nov. 17, 1999) <http://www.iosoftware.com/biosols/sony/fiu/applications/fit100.htm>, 2 pages.
*Sony Fingerprint Identification Unit (FIU–700)* (visited Nov. 17, 1999) <http://www.iosoftware.com/biosols/sony/fiu70/index.htm>, 2 pages. (Unit available late 1999).
*Sony Fingerprint Identification Unit* (visited Nov. 17, 1999) <http://www.iosoftware.com/biosols/sony/fiu/index.htm>, 3 pages.
*Fujitsu Fingerprint Recognition Device (FPI–550)* (visited Nov. 17, 1999) <http://www.iosoftware.com/biosols/fujitsu/fpl550.htm>, 2 pages.
*Mitsubishi MyPass LP–1002* (visited Nov. 17, 1999) <http://www.iosoftware.com/biosols/mitsubishi/mypass.htm>, 2 pages.
*SecureTouch PV—A Personal "Password Vault"* (visited Nov. 17, 1999) <http://www.biometricaccess.com/securetouch_pv.htm>, 1 page.
*Digital Descriptor Systems, Inc.–Profile* (visited Nov. 17, 1999) <http://www.ddsi–cpc.com/pages/profile.html>, 3 pages.
*Press Release: Printrak International Announces New Portable Fingerprint ID Solution*, Dec. 10, 1996, (visited Nov. 17, 1999) <http://www.scott.net/–dg/25.htm>, 3 pages.
*Corporate Profile* (visited Nov. 17, 1999) <http://www.printrakinternational.com/corporate.htm>, 1 page.
*Printrak Products* (visited Nov. 17, 1999) <http://www.printrakinternational.com/Products.htm>, 1 page. (Discusses Technology as early as 1974).
Verifier™ 200 Fingerprint Capture Devices, Cross Match Technologies, Inc., 2 pages. 1996–1997.
Verifier 200 Direct Fingerprint Reader, Cross Check Corporation, 2 pages, 1996–1997.
Verifier™ 250 Fingerprint Capture Devices, Cross Match Technolgies, Inc., 2 pages, 1996–1997.
Verifier 250 Small Footprint Direct Fingerprint Reader, Cross Check Corporation, 2 pages, 1996–1997.
Verifier™ 290 Fingerprint Capture Devices, Cross Match Technologies, Inc., 2 pages, 1996–1997.
Verifier 290 Direct Rolled Fingerprint Reader, Cross Check Corporation, 2 pages, 1996–1997.
Verifier™ 500 Fingerprint Capture Devices, Cross Match Technologies, Inc., 2 pages, 1998.
Biometric terminal, 1 page.
10–Print Imaging System, Cross Check Corporation, 2 pages, 1998.
*Cross Match Technologies, Inc.* (visited Mar. 25, 1999) <http://www.crossmatch.net/>, 1 page.
*Cross Match Technologies, Inc.—Products Overview* (visited Mar. 25, 1999) <http://www.crossmatch.net/new/products/product–index.html>, 1 page.
*Cross Match Technologies, Inc.—Law Enforcement Systems* (visited Mar. 25, 1999) <http://www.crossmatch.net/new/law/law–index.html>, 2 pages.
*Cross Match Technologies, Inc.—Commercial Systems: Building On The Standard* (visited Mar. 25, 1999) <http://www.crossmatch.net/new/commercial/commercial–index.html>, 2 pages.
*Cross Match Technologies, Inc.—International Sales* (visited Mar. 25, 1999) <http://www.crossmatch.net/new/sales/sales–index.html>, 1 page.
*Cross Match Technologies, Inc.—Support* (visited Mar. 25, 1999) <http://www.crossmatch.net/new/support/support–index.html>, 1 page.
*Cross Match Technologies, Inc.—News—Press Releases— Verifier 400 Press Release* (visited Mar. 25, 1999) <http://www.crossmatch.net/new/news/news–pr–050798.html>, 1 page.
*Global Security Fingerscan™ System Overview* (visited Jan. 11, 2000) <http://wwwu–net.com/mbp/sol/g/a9.htm>, 12 pages.
"Command Structure for a Low–Cost (Primitive) Film Scanner," *IBM Technical Disclosure Bulletin,* IBM Corp., vol. 35, No. 7, Dec. 1992, pp. 113–121.
*Fingerprint Scan API Toolkit Version 1.x Feature List* (Apr. 26, 2000) <http://www.mentalix.com/api/archive_fapiv–l.htm>, 3 pages.
"Image Acquisition System," *IBM Technical Disclosure Bulletin,* IBM Corp., vol. 29, No. 5, Oct. 1986, pp. 1928–1931.
Kunzman, Adam J. and Wetzel, Alan T., "1394 High Performance Serial Bus: The Digital Interface for ATV," *IEEE Transaction on Consumer Electronics,* IEEE, vol. 41, No. 3, Aug. 1995, pp. 893–900.
*Mentalix Provides The First IAFiS–Certified Latent Print Scanning Solution For Windows® (Jul. 23, 1999)* <http://www.mentalix.com/pressreleases/fprintplook3_pre1.htm>, 2 pages.
Sluijs, F. et al., "An On–chip USB–powered Three–Phase Up/down DC/DC Converter in a Standard 3.3V CMOS Process," *2000 IEEE International Solid–State Circuits Conference,* IEEE, Feb. 9, 2000, pp. 440–441.
Venot, A. et al., "Automated Comparison of Scintigraphic Images," *Journal of Nuclear Medicine,* vol. 27, No. 8, Aug. 1986, pp. 1337–1342.
English–language Abstract for Japanese.Patent Publication No. 59–103474, published Jun. 14, 1984, printed from espacenet.com, 1 page.
English–language Abstract for Japanese Patent Publication No. 62–212892, published Sep. 18, 1987, printed from espacenet.com, 1 page.
English–language Abstract for Japanese Patent Publication No. 1–205392, published Aug. 17, 1989, printed from espacenet.com, 1 page.
English–language Abstract for Japanese Patent Publication No. 3–161884, published Jul. 11, 1991, printed from espacenet.com, 1 page.

English–language Abstract for Japanese Patent Publication No. 3–194674, published Aug. 26, 1991, printed from espacenet.com, 1 page.

English–language Abstract for Japanese Patent Publication No. 3–194675, published Aug. 26, 1991, printed from espacenet.com, 1 page.

English–language Abstract for Japanese Patent Publication No. 10–079017, published Mar. 24, 1998, printed from espacenet.com, 1 page.

English–language Abstract for Japanese Patent Publication No. 10–262071, published Sep. 29, 1998, printed from espacenet.com, 1 page.

English–language Abstract for Japanese Patent Publication No. 11–167630, published Jun. 22, 1999, printed from espacenet.com, 1 page.

English–language Abstract for Japanese Patent Publication No. 11–225272, published Aug. 17, 1999, printed from espacenet.com, 1 page.

English–language Abstract for Japanese Patent Publication No. 11–252489, published Sep. 17, 1999, printed from espacenet.com, 1 page.

English–language Abstract for Japanese Patent Publication No. 11–289421, published Oct. 19, 1999, printed from espacenet.com, 1 page.

* cited by examiner

LIGHT WEDGE FOR ILLUMINATING A PLATEN IN A PRINT SCANNER

CROSS-REFERENCE TO RELATED APPLICATIONS

This application is a continuation-in-part application of U.S. application Ser. No. 10/050,046, filed Jan. 17, 2002, which is incorporated herein by reference in its entirety.

FIELD OF THE INVENTION

The present invention pertains to biometric imaging technology, and in particular, to live scanning of print ridge patterns.

BACKGROUND OF THE INVENTION

Biometric imaging systems include, but are not limited to, print ridge pattern or print imaging systems. These print imaging systems are often referred to in the relevant art as scanners or live scanners. Conventional live scanners use light to detect an image of a print. For example, an object having a print such as one or more fingers can be placed on a platen of a live scanner. An illumination source illuminates the underside of the platen. An image representative of the ridge pattern of the print is detected by an image sensor such as, for example, a solid-state camera.

Increasing demands are placed on the quality of a print image detected by live scanners. Live scanners are desired that can capture print images having a high-contrast and a high-resolution. One standard for live scanners promulgated by the Federal Bureau of Investigation (FBI) is the Integrated Automated Fingerprint Identification System (IAFIS) Image Quality Specifications (IQS) (Appendix F). To gain certification under Appendix F, a live scanner among other things must be able to capture an image at a resolution of 500 dots per inch (dpi) or greater and have generally uniform gray shading across a platen scanning area.

What is needed are systems and methods that can meet the increasing demands for capturing high-resolution and high-contrast print images.

BRIEF SUMMARY OF THE INVENTION

The present invention provides light wedges and diffuse light illumination systems and scanners that use the light wedges. A light wedge according to the present invention may have various shapes that reflect light internally and produce diffuse light. Illumination systems according to the present invention include an illumination source and a light wedge. The light wedge reflects light internally, which makes the illumination diffuse. Scanners according to the present invention use the diffuse light produced by the light wedges to uniformly illuminate a platen. Such uniform, diffuse illumination according to embodiments of the invention helps provide a flat illumination across a platen scanning area to ensure a high-resolution print image can be captured with minimal gray scale variation.

In one example light wedge of the present invention, the light wedge has an illumination surface that receives light emitted from an illumination source. An illumination source can be any type of emitter or combination of emitters. A first surface of the light wedge limits specular reflections. A second surface of the light wedge acts as a diffuser. The second surface reflects light out of the light wedge toward the platen of a live scanner, whereby uniform illumination is provided to the platen. The first surface and/or the second surface are preferably painted with a paint having a color other than white such as, for example, green paint. Using a color other than white limits the amount of ambient light (light from a source other than the illumination source) that is reflected by the light wedge toward the platen. The first surface and/or the second surface can be ground prior to being painted. Other diffused and absorbing materials, optically coupled to the first surface and/or the second surface, can be used in lieu of painting.

In another example light wedge of the present invention, the light wedge has a first surface that receives light emitted from the illumination source and a second surface that limits specular reflections. The light wedge transmits light from the illumination source toward the platen of a scanner, whereby uniform illumination is provided to the platen.

It is a further feature of the present invention that a diffuser can be provided near the light wedge such that light passing out from the light wedge passes through the diffuser before illuminating the platen. The diffuser further diffuses the light that illuminates the platen of a scanner.

Many different types of illumination sources can be used with the light wedges of the present invention. In one example, an illumination source is used that emits color light (e.g., light of a single wavelength or narrowband range of wavelengths). This illumination source can be a single source or an array of sources such as light-emitting diodes. In one example of an array, the sources of the array are divided into at least two separately controllable groups of lights. In another example of an array, each of the sources can be independently controlled relative to other sources to facilitate correcting or minimizing drift, thereby ensuring a flat, uniform illumination is provided to the platen.

Further embodiments, features, and advantages of the present inventions, as well as the structure and operation of the various embodiments of the present invention, are described in detail below with reference to the accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
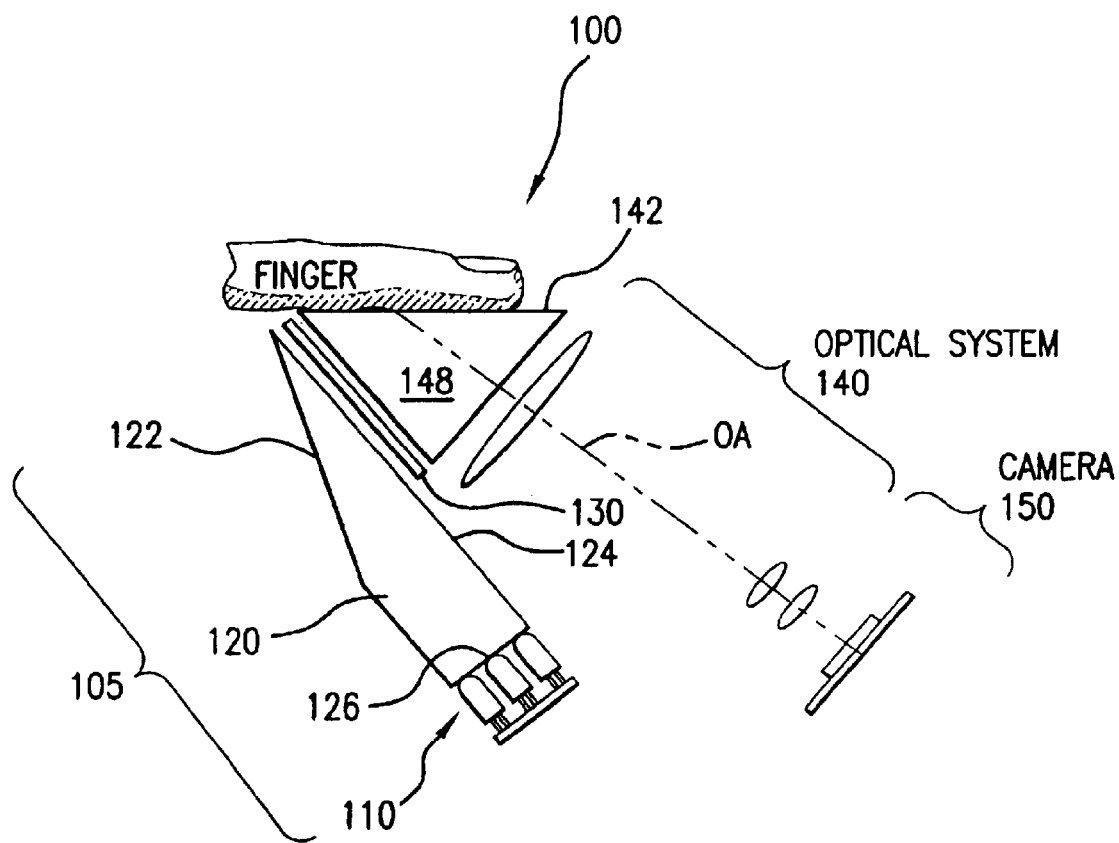
FIG. 1 is a diagram of a print scanner that includes a light wedge according to an embodiment of the present invention.

The present invention will now be described with reference to the accompanying drawings. In the drawings, like reference numbers indicate identical or functionally similar elements. Additionally, the leftmost digit(s) of a reference number identifies the drawing in which the reference number first appears.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

1. Overview

The present invention provides among other things means for achieving uniform, diffuse light illumination of a platen in a live scanner. Live scanners incorporating the present invention are able to meet the increasing demands for capturing high-resolution and high-contrast print images.

2. Terminology

To more clearly delineate the present invention, an effort is made throughout the specification to adhere to the following term definitions consistently.

The term "finger" refers to any digit on a hand including, but not limited to, a thumb, an index finger, a middle finger, a ring finger, or a pinky finger.

The term "live scan" refers to a scan of any print ridge pattern made by a print scanner. A live scan can include, but is not limited to, a scan of a finger, a finger roll, a flat finger, a slap print of four fingers, a thumb print, a palm print, or a combination of fingers, such as, sets of fingers and/or thumbs from one or more hands or one or more palms disposed on a platen.

In a live scan, for example, one or more fingers or palms from either a left hand or a right hand or both hands are placed on a platen of a scanner. Different types of print images are detected depending upon a particular application. A flat print consists of a fingerprint image of a digit (finger or thumb) pressed flat against the platen. A roll print consists of an image of a digit (finger or thumb) made while the digit (finger or thumb) is rolled from one side of the digit to another side of the digit over the surface of the platen. A slap print consists of an image of four flat fingers pressed flat against the platen. A palm print involves pressing all or part of a palm upon the platen. A platen can be movable or stationary depending upon the particular type of scanner and the type of print being captured by the scanner.

The terms "biometric imaging system," "print scanner," "scanner," "live scanner," "live print scanner," and "fingerprint scanner" are used interchangeably, and refer to any type of scanner which can obtain an image of a print ridge pattern in a live scan. The obtained images can be combined in any format including, but not limited to, an FBI, state, or international tenprint format.

The term "platen" refers to a component that includes an imaging surface upon which at least one finger, for example, is placed during a live scan. A platen can include, but is not limited to, a surface of an optical prism or a surface of a silicone layer or other element disposed in optical contact with a surface of an optical prism.

The term "surface that limits specular reflections" refers to a non-mirror-like surface. For example, as used herein, surfaces that limit specular reflections include surfaces that are ground, roughened, and/or frosted. As used herein, surfaces that limit specular reflections also include polished surfaces that are optically coupled to a diffused and/or absorbing material such as, for example, paint or tape. A surface that limits specular reflections can also be a combination of the above such as, for example, a ground surface that is painted.

3. Example Illumination System Having a Light Wedge

FIG. 1 is a diagram of print scanner 100. Print scanner 100 includes an illumination system 105 having a light wedge 120. An illumination source array 110 inputs light at an end region 126 of light wedge 120. Light is internally reflected within light wedge 120 and passes to a surface 122. Surface 122 is one angled face or surface of light wedge 120. Preferably, surface 122 is provided at an angle with respect to the optical axis along which light is emitted by illumination source array 110. In one embodiment, surface 122 acts to both reflect light and make the reflected light more diffuse.

Illumination source array 110 can emit light at a single wavelength or narrowband range of wavelengths, such as infrared and/or visible wavelengths. In an embodiment of the invention, illumination source array 110 emits light having a blue/green wavelength ("blue/green light").

Figure 2A:
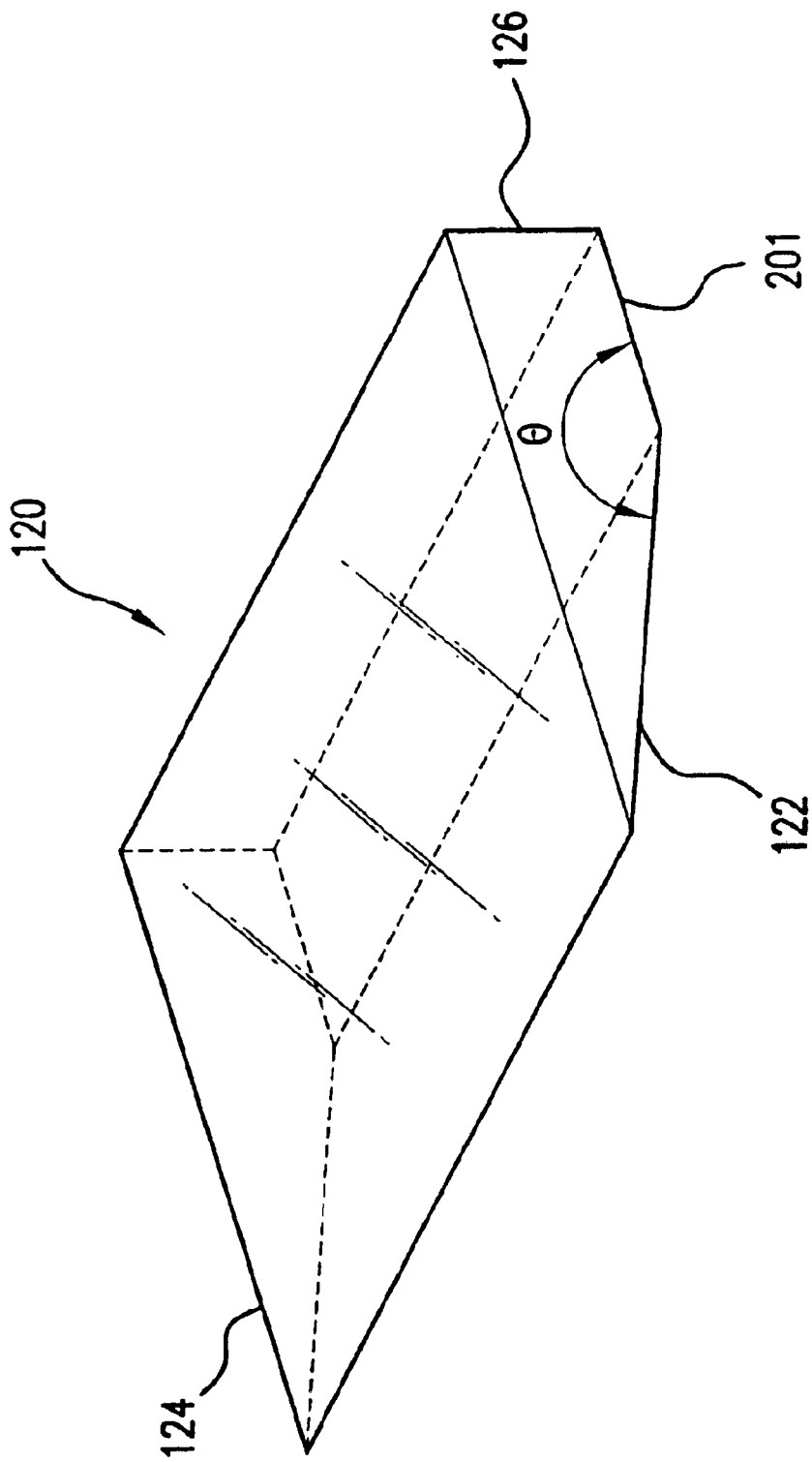
FIG. 2A is a diagram of the light wedge of FIG. 1.

FIG. 2A is a diagram further illustrating light wedge 120 of FIG. 1. Light wedge 120 can be made from a variety of different optical materials such as, for example, acrylic, lexan, or glass. As shown in FIG. 2A, light wedge 120 has a surface 201 that is substantially parallel to surface 124 and substantially perpendicular to surface 126. The angle θ, formed between surface 201 and surface 122, is less than 180 degrees. A light wedge wherein this angle θ is less than 180 degrees is defined herein as a Type-1 light wedge.

Figure 2B:
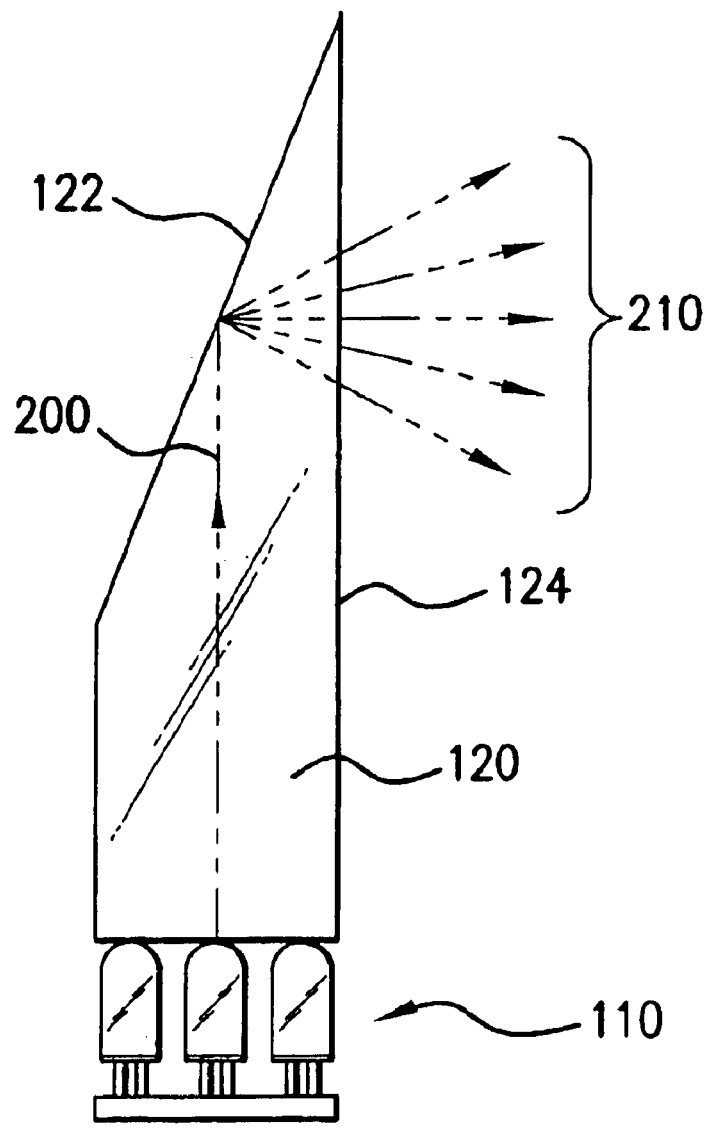
FIG. 2B is a diagram that illustrates diffuse light rays reflected from a surface of the light wedge of FIG. 1

As shown in FIG. 2B, light rays 200 emitted by illumination source 110 pass through light wedge 120 to impinge on surface 122. Diffuse, reflected rays 210 then pass from surface 122 out through surface 124 of light wedge 120. For clarity, other ray paths illustrating the internal reflection of light within light wedge 120 are omitted. This internal reflection within light wedge 120 provides a further advantage, however, as it tends to make the light even more diffuse and improve grey scale shading.

Referring to FIG. 1, light passing from surface 124 of light wedge 120 passes to diffuser 130. Optional diffuser 130 makes the light even more diffuse so that uniform illumination is provided to platen 142. In one application, diffuser 130 can be omitted to reduce cost and complexity. When a finger is placed on platen 142, as shown in FIG. 1, an image of the finger is sent through optical system 140 to camera system 150 for detection and processing. Optical system 140 can be any conventional optical system in a print scanner. Similarly, camera system 150 can be any type of camera including, but not limited to, one or more CCD or CMOS cameras.

In one embodiment, surface 122 includes a layer of reflecting paint applied to the surface of a light wedge 120. Any color paint can be used. Preferably, the color of paint used will have a high reflectance at the wavelength of light emitted by illumination source array 110. The paint acts as a diffuser seen by illumination light source array 110 that acts to remove at least part of the illumination structure caused by the one or more cones of light emitted by light source array 110. Optional diffuser 130 acts to remove more or all of the remaining illumination structure such that a uniform illumination is passed to prism 148. Surface 122 can also be ground prior to painting.

In addition to acting as a diffuser, the paint applied to surface 122 acts to limit the amount of ambient light reflected by light wedge 120 toward platen surface 142 and hitting camera 150. In a preferred embodiment, the paint applied to surface 122 has a color other than white. In one preferred embodiment, green paint is applied to surface 122.

Figure 3A:
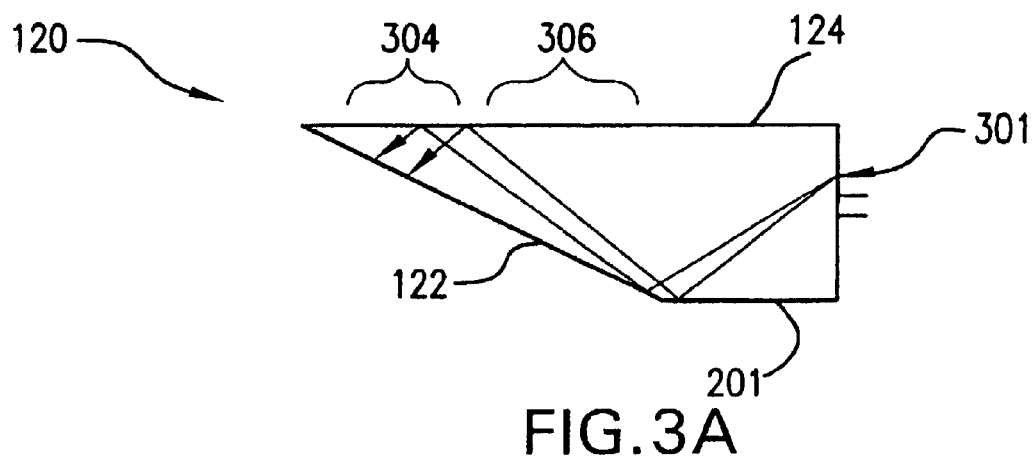
FIGS. 3A-3C illustrate how light is internally reflected in the light wedge of FIG. 1 from an untreated surface.
Figure 3B:
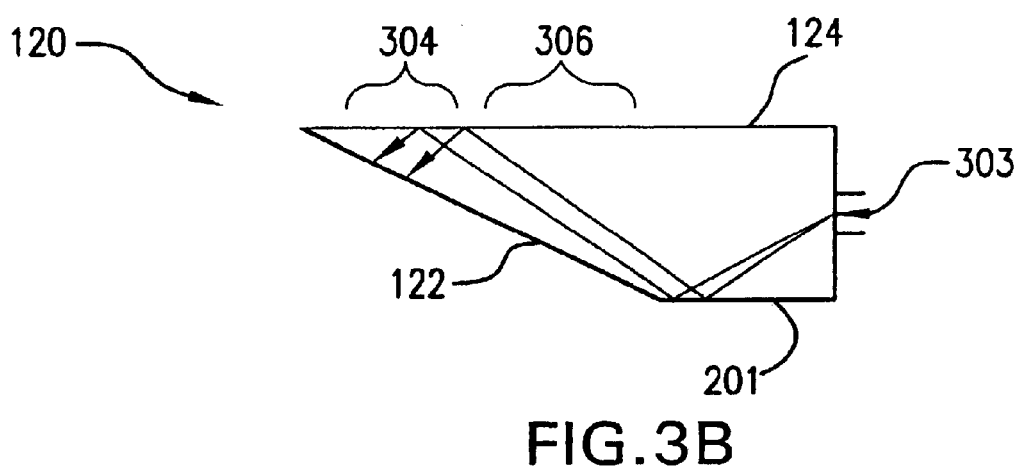
Figure 3C:
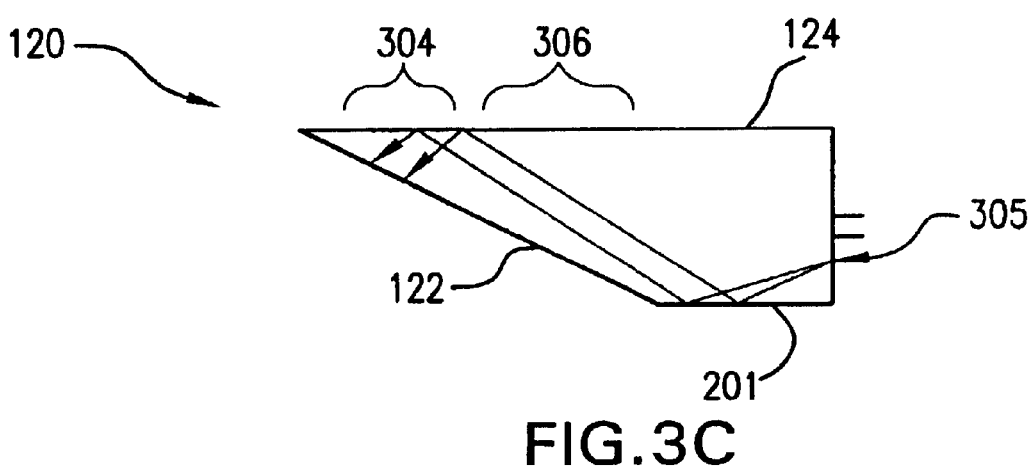

The inventors discovered that in certain situations, a light wedge with an untreated surface 201 can create areas of unbalanced illumination ("hot spots"). FIGS. 3A-3C illustrate how rays of light entering different portions of light wedge 120 of illumination system 105 are internally reflected from an untreated surface 201 to end up at an area 304 of surface 124. Area 304 is a "hot spot" in that it receives a disproportionately greater amount of light from illumination source 110 than area 306 of light wedge 120. This phenomenon, if permitted to occur, can complicate the control system needed to adjust illumination light source array 110 of illumination system 105.

As shown in FIG. 3A, certain rays of light from area 301 of light wedge 120 fall upon untreated surface 201 and are reflected toward surface 124. This reflected light strikes surface 124 and is reflected toward surface 122. Surface 122 diffuses the light and reflects this light to area 304 of surface 124 of light wedge 120.

As shown in FIG. 3B, certain rays of light from an area 303 of light wedge 120 also fall upon untreated surface 201 and are reflected toward surface 124. This reflected light strikes surface 124 and is reflected toward surface 122. Surface 122 diffuses the light and reflects this light to area 304 of surface 124.

As shown in FIG. 3C, certain rays of light from area 305 of light wedge 120 are also reflected by untreated surface 201 and surfaces 124 and 122 to end up at area 304 of surface 124.

4. Wedge Light Accumulation Solutions

The present invention provides several solutions to the light accumulation phenomenon described herein. One solution involves applying a covering material to surface 201 of light wedge 120 to modify the optical characteristics of surface 201. Another solution involves modifying the shape of light wedge 120 so that surface 201 is optically no longer substantially parallel to surface 124. Still another solution involves changing the shape of surface 122 of light wedge 120. Each of these solutions will now be described.

According to the present invention, the accumulation of light at area 304 of light wedge 120, from light entering different portions of surface 126 of light wedge 120, can be prevented by changing the optical characteristics of surface 201. This can be accomplished, for example, by covering surface 201 with paint, tape, or any other optically coupled diffused and absorbing material.

Figure 4A:
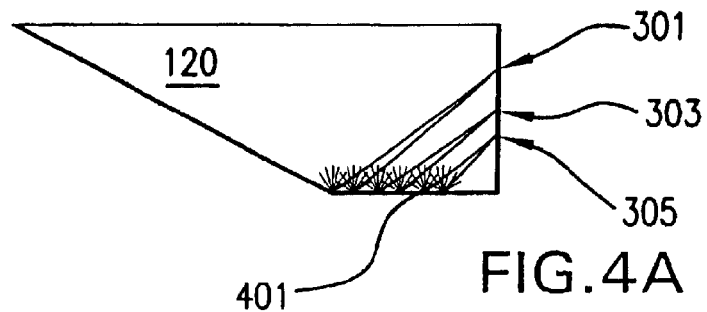
FIG. 4A illustrates how light is internally reflected in the light wedge of FIG. 1 from a surface in accordance with the present invention.

FIG. 4A illustrates how light is internally reflected in light wedge 120 of illumination system 105 from a painted surface 401. Applying a layer of paint (any color) to surface 201 to form a surface 401 reduces or eliminates the light accumulation or "hot spot" phenomenon described herein. This is because the paint limits spectral reflections resulting from the illumination structure or cones of light emitted by light source array 110. In an embodiment, surface 401 is a ground surface formed, for example, by roughening or frosting surface 201. A reflecting or an absorbing layer of paint can then be applied to the ground surface. As noted above, light wedge 120 is a Type-1 light wedge.

Painting surface 201 of light wedge 120 simplifies the control system (not shown) needed to provide appropriate current levels to each emitter or groups of emitters that make up light source array 110. As will be understood by persons skilled in the relevant arts given the description herein, elimination of the light accumulation phenomenon shown in FIGS. 3A-C makes it easier to correct for natural light fall off or drift, and easier to provide a flat, uniform illumination of sufficient power to the platen. Elimination of the light accumulation phenomenon also simplifies calibration of the illumination system.

As described above for surface 122, the paint applied to surface 201 acts to limit the amount of ambient light entering light wedge 120 and hitting camera 150. In a preferred embodiment, the paint applied to surface 201 to form surface 401 has a color other than white. In one preferred embodiment, green paint is applied to surface 201.

As noted above, materials other than paint can be used to change the optical characteristics of surface 201 and thereby implement the present invention. Materials that can be applied to surface 201 in accordance with the present invention will be known to persons skilled in the relevant arts given the description herein. These materials are optically coupled to surface 201 in order to displace air and minimize reflections off of surface 201. The present invention does not require that a material be applied to surface 201, however, as the present invention can be achieved by a ground surface 201 only (e.g., without painting).

Figure 4B:
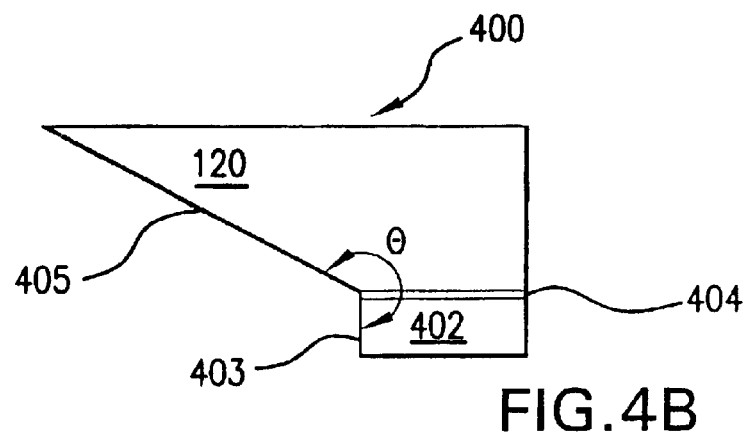
FIGS. 4B-4D illustrates various shapes for a light wedge according to the present invention.
Figure 4C:
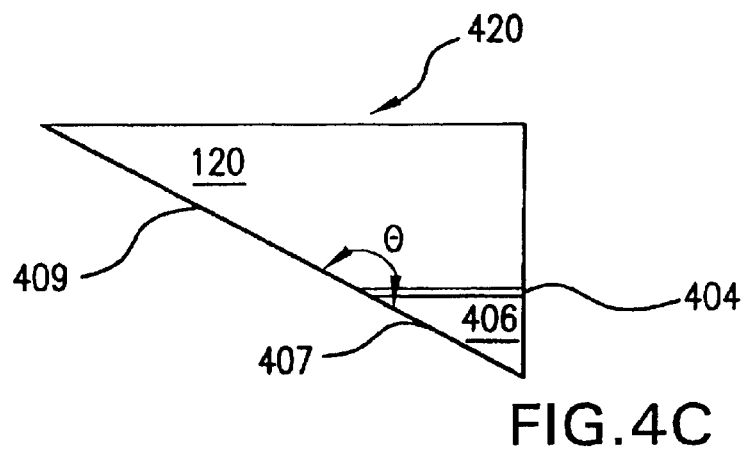
Figure 4D:
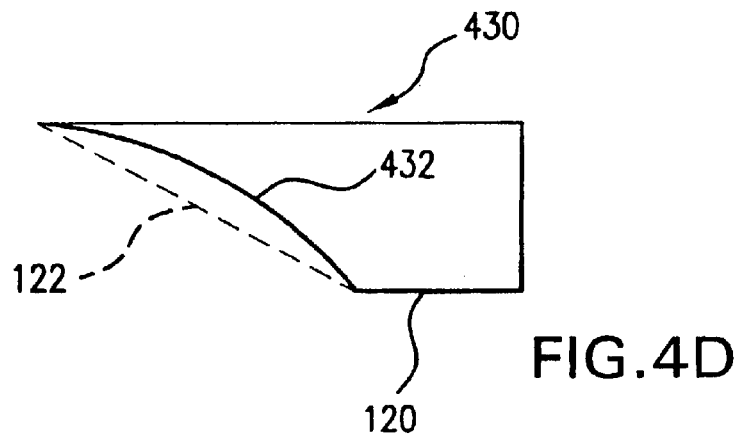

FIGS. 4B-4D illustrate various shapes for a light wedge according to the present invention that reduce or prevent the light accumulation phenomenon shown in FIGS. 3A-C. As described below, these various shapes are referred to herein as Type-2, Type-3, and Type-4 light wedges, respectively.

FIG. 4B shows a light wedge 400 formed by adding a rectangular block 402 (e.g., a block of acrylic material) to light wedge 120. Oil or optically clear adhesive 404 is used to optically couple rectangular block 402 to light wedge 120. Optically coupling rectangular block 402 to light wedge 120 means that surface 201 of light wedge 120 no longer substantially reflects light back into light wedge 120, but instead allows light to pass through surface 201. Because the two blocks (i.e., block 402 and light wedge 120) are optically coupled, the rays of light illustrated in FIGS. 3A-C pass through surface 201 and enter rectangular block 402, thereby preventing their accumulation at area 304.

As shown in FIG. 4B, rectangular block 402 has a surface 403 that forms an angle θ with respect to a surface 405. This angle θ is greater than 180 degrees. As defined herein, a Type-2 light wedge is a light wedge wherein this angle θ is greater than 180 degrees.

FIG. 4C shows a light wedge 420 formed by adding a triangular block 406 to light wedge 120. Oil or optically clear adhesive 404 is also used to optically couple triangular block 406 to light wedge 120. Optically coupling triangular block 406 to light wedge 120 means that surface 201 of light wedge 120 no longer substantially reflects light back into light wedge 120. In this way, the rays of light illustrated in FIGS. 3A-C pass through surface 201 and enter triangular block 406, thereby preventing their accumulation at area 304.

As shown in FIG. 4C, triangular block 406 has a surface 407 that forms an angle θ with respect to a surface 409. This angle θ is equal to 180 degrees. As defined herein, a Type-3 light wedge is a light wedge wherein this angle θ is equal to 180 degrees.

As will by understood be persons skilled in the relevant arts given the description herein, light wedges 400 and 420 can be formed from a single block, or more than two blocks, rather than just the two blocks illustrated in FIGS. 4B and 4C.

FIG. 4D shows a light wedge 430 formed, for example, by reshaping surface 122 of light wedge 120 to produce a non-flat surface 432. As illustrated in FIG. 5C, the shape of surface 432 precludes the light accumulation phenomenon shown in FIGS. 3A-C from occurring by causing light from areas 301, 303, and 305 of light wedge 430 to fall upon different areas of surface 432 (see FIG. 5C). As defined herein, a Type-4 light wedge is a light wedge having a non-flat surface 432 such that it precludes the light accumulation phenomenon described herein from occurring.

Figure 5A:
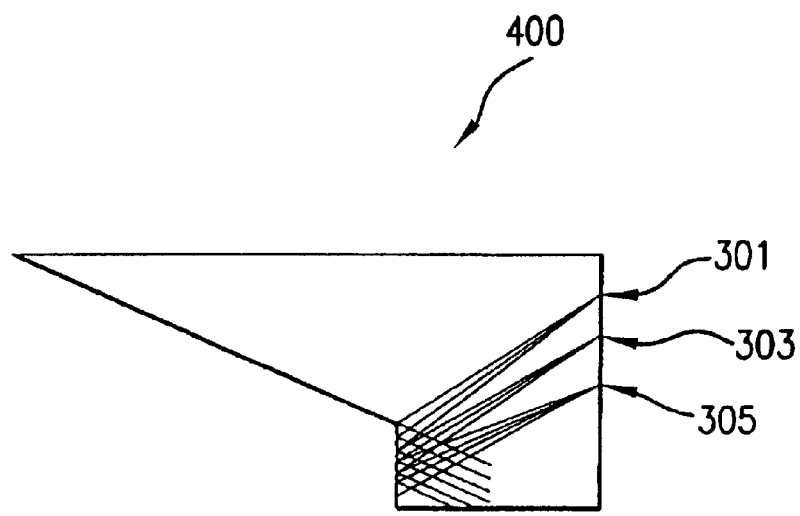
FIGS. 5A-5C illustrate how light is internally reflected in the light wedges in FIGS. 4B-4D.
Figure 5B:
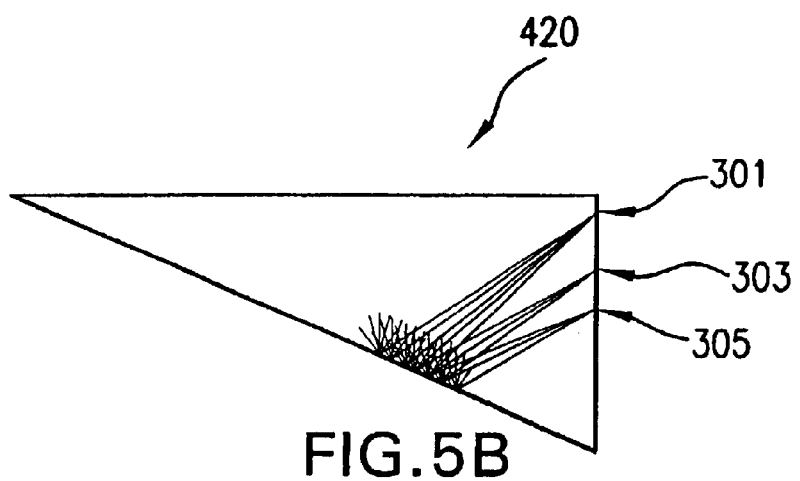
Figure 5C:
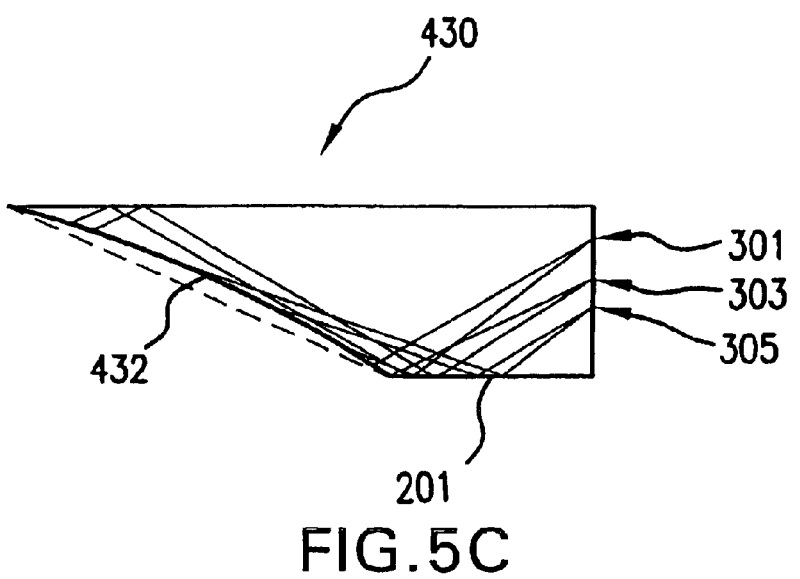

FIGS. 5A-5C illustrate how light is internally reflected in light wedges 400, 420, and 430, respectively. For clarity, other ray paths illustrating the internal reflection of light within light wedges 400, 420, and 430 are omitted.

A light wedge according to the present invention can be used with any type of illumination light source in any type of print scanner. For instance, a light wedge 120 can be used with any type of optical fingerprint and/or palm print scanner including, but not limited to, a single finger scanner, multiple finger scanner, palm print scanner, rolled finger print scanner, and/or a slap fingerprint scanner.

5. Example Illumination Sources and Control

As described herein, any illumination source can be used with the light wedges of the present invention. Such illumination sources include, but not limited to, an array of discrete light emitters, such as, light-emitting diodes (LEDs) or laser diodes. In one embodiment, an illumination source array having evenly spaced emitters is used. In another embodiment, an illumination source array having unevenly spaced emitters is used.

Figure 6:
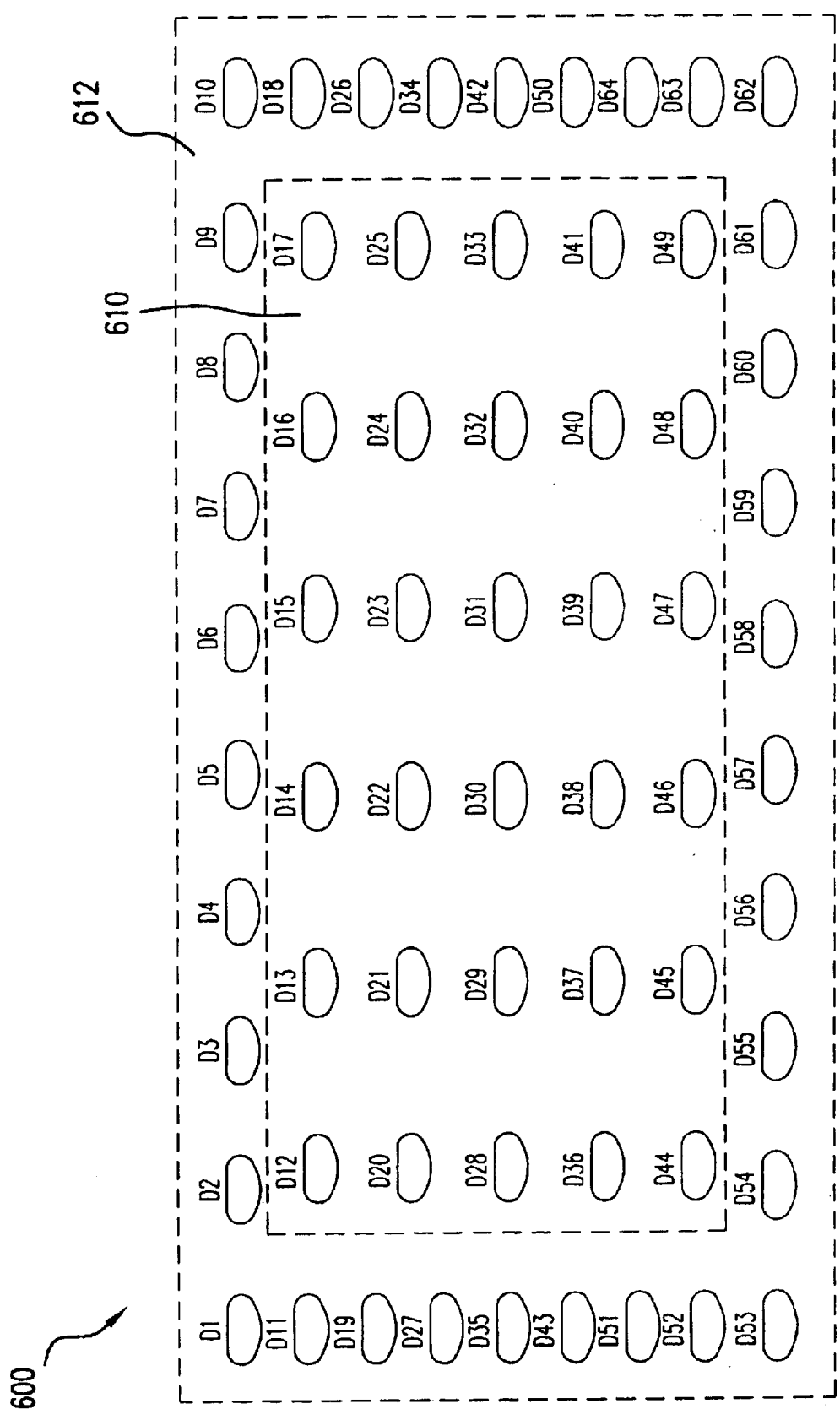
FIG. 6 illustrates a first example of a non-uniform illumination source array according to a further feature of the present invention.
Figure 7:
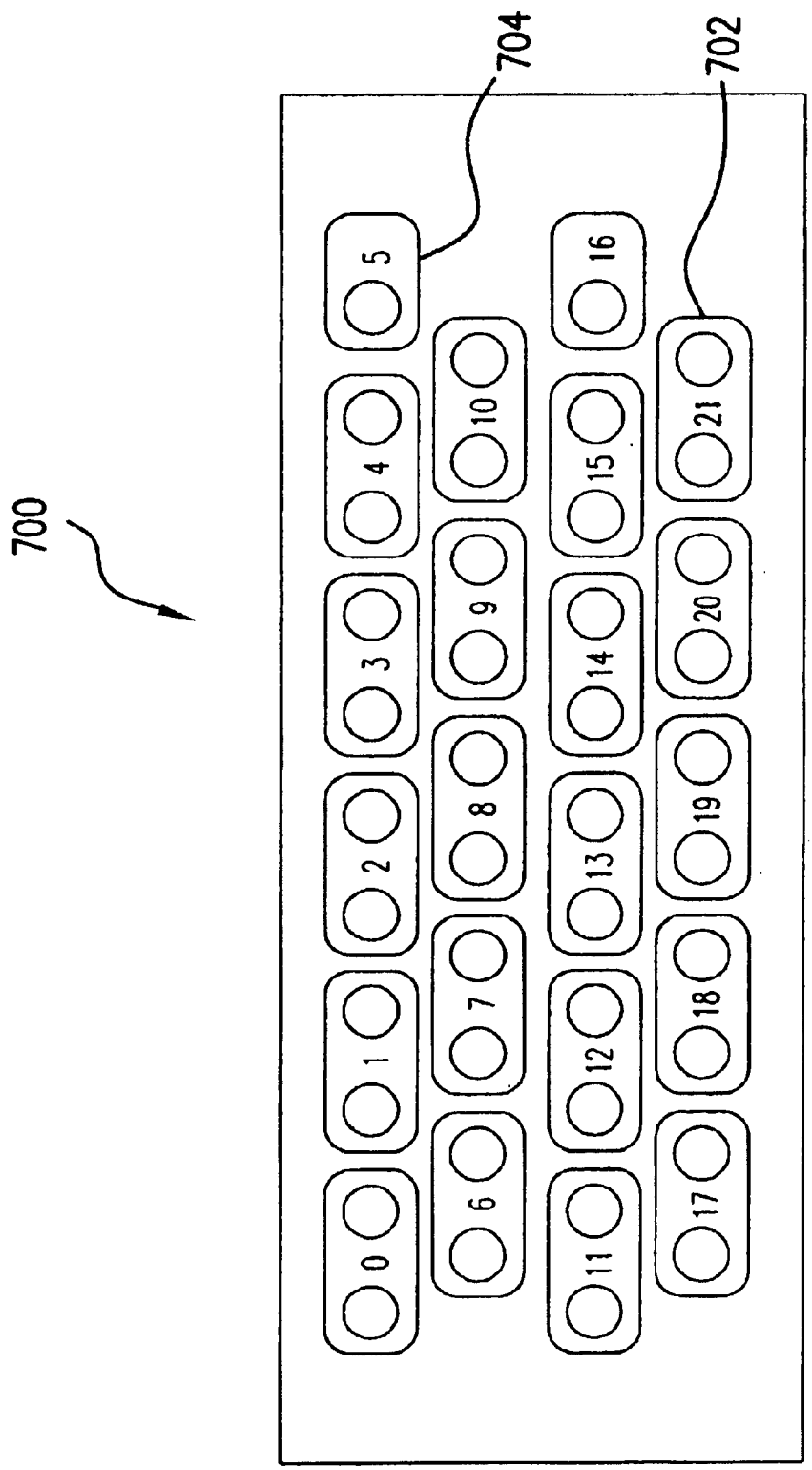
FIG. 7 illustrates a second example of a non-uniform illumination source array according to a further feature of the present invention.

FIGS. 6 and 7 are diagrams of example non-uniform illumination source arrays according to a further feature of the present invention. As shown in FIG. 6, non-uniform illumination source array 600 consists of an array of sixty-four discrete emitters (D1–D64) such as light emitting diodes (LEDs). Non-uniform illumination source array 600 includes a center region 610 and a perimeter region 612. As shown in FIG. 7, non-uniform illumination source array 700 consists of an array of twenty-one groups of discrete emitters or LEDs.

Non-uniform illumination source arrays 600 and 700 can emit light at a single wavelength or narrowband range of wavelengths, such as infrared and/or visible wavelengths. In one embodiment, non-uniform illumination source arrays 600 and 700 are designed to emit light in the blue/green spectrum, that is, a wavelength or narrowband of wavelengths equal to or approximately equal to 510 nm, to enhance the dynamic range of grey scale shading. The inventors have compared images of prints obtained using red light operating at 650 nm and images obtained using blue/green light at 510 nm. Results obtained by the inventors indicate an approximately 14% to 20% increase in the dynamic range of grey scale shading in an image of a print of a finger or palm detected with a print scanner using blue/green light at about 510 nm. Increasing the dynamic range of grey scale shading in a detected print image further causes the print scanner to operate well over an even wider range of skin conditions (i.e., dry, wet, oily, etc.).

As illustrated in FIG. 6, non-uniform illumination source array 600 is made up of a plurality of discrete emitters. Center region 610 is an area where the density of emitters is lower than the density of emitters in perimeter region 612. In this way, non-uniform illumination source array 600 has an advantage in that natural light falloff that occurs in a perimeter region of an imaging system is corrected by the relatively higher density of emitters arranged in perimeter region 612. In addition, according to a further feature, each emitter can be individually controlled to correct for or minimize drift and maximize flexibility. This individual control and flexibility further enables a designer of a print scanner to make sure that uniform, flat illumination is provided across a platen.

As illustrated in FIG. 7, non-uniform illumination source array 700 is made up of a plurality of emitter groups 702 and 704 (e.g., groups of LEDs). Each emitter group 702 includes two emitters. Each emitter group 704 includes one emitter. Other groupings of the emitters are also contemplated and are within the scope of the invention. The emitter groups of non-uniform illumination source array 700 can be individually controlled to correct for or minimize drift and maximize flexibility.

In each of the embodiments of FIGS. 6 and 7, current control circuitry (not shown) is coupled to the individual emitters or groups of emitters as would be apparent to a person skilled in the art given this description. Such circuitry provides appropriate current levels to each emitter or groups of emitters to correct for natural light fall off or drift, so that a flat, uniform illumination of sufficient power is provided to a platen. Such current levels can be set manually or automatically in advance as part of a calibration routine and/or adjusted in real-time based on feedback from the detected images.

6. Conclusions

While specific embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. An illumination system that provides uniform illumination for a platen in a print scanner, comprising:

an illumination source array that emits light from a plurality of discrete light sources; and a light wedge having an illumination surface that receives light emitted from said illumination source array, a first painted surface that limits specular reflections, and a second painted surface that acts as diffuser, wherein said second painted surface reflects light out of said light wedge toward the platen, and whereby uniform illumination is provided to the platen.

2. The illumination system of claim 1, wherein said first painted surface is ground prior to being painted.

3. The illumination system of claim 1, wherein said second painted surface is ground prior to being painted.

4. The illumination system of claim 1, further comprising:

a diffuser provided near said light wedge such that light passing out from said light wedge passes through said diffuser before illuminating the platen.

5. The illumination system of claim 4, wherein said diffuser comprises a holographic diffuser.

6. The illumination system of claim 1, wherein said illumination source array comprises a plurality of sources that emit color light.

7. The illumination system of claim 6, wherein the color light is blue/green light.

8. The illumination system of claim 6, wherein the color light is red light.

9. The illumination system of claim 6, wherein said first painted surface is painted with a color similar to the color light emitted by said plurality of sources.

10. The illumination system of claim 6, wherein said second painted surface is painted with a color similar to the color light emitted by said plurality of sources.

11. The illumination system of claim 1, wherein said plurality of sources are divided into at least two separately controllable groups of lights.

12. The illumination system of claim 1, wherein said plurality of sources are divided into at least a center region and a perimeter region, wherein the density of sources provided in said perimeter region is greater than in said center region.

13. The illumination system of claim 1, wherein the intensity of each source can be independently controlled relative to other sources such that a flat, uniform illumination is provided to the platen.

14. The illumination system of claim 1, wherein said first painted surface is painted with a green paint.

15. The illumination system of claim 1, wherein said second painted surface is painted with a green paint.

16. The illumination system of claim 1, wherein said first painted surface and said second painted surface are painted with a paint having a color other than white.

17. The illumination system of claim 1, wherein said first painted surface and said second painted surface are painted with a green paint.

* * * * *